March 31, 1953 W. C. GEISER ET AL 2,633,245
FUEL TANK AND FILTER ASSEMBLY
Filed Jan. 14, 1948 2 SHEETS—SHEET 1
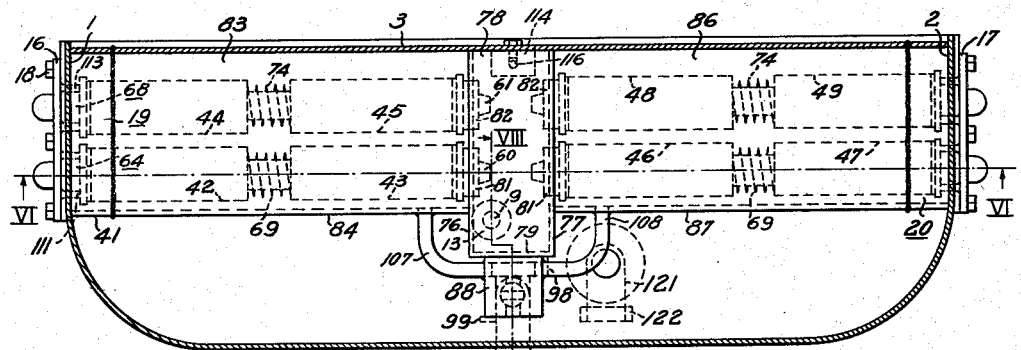
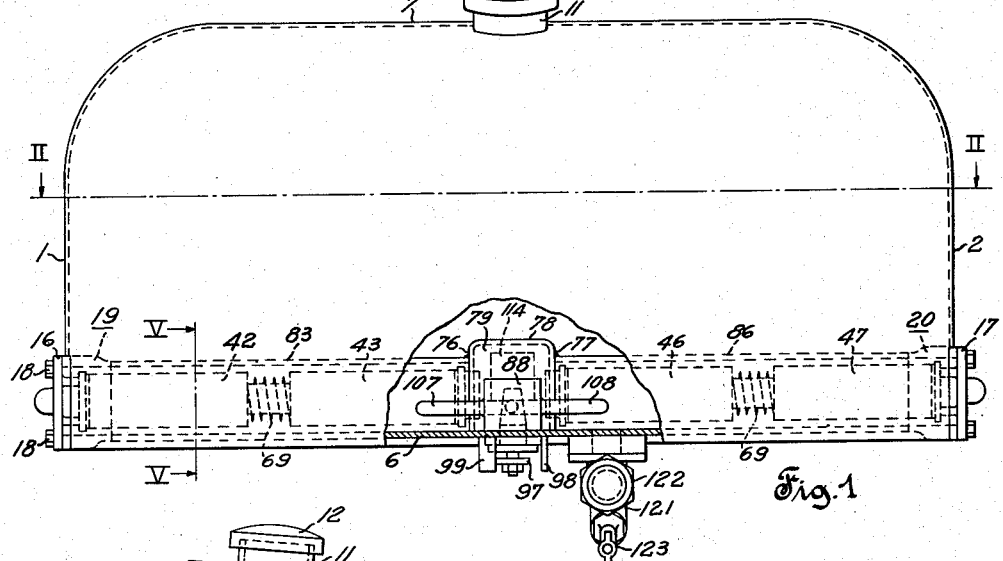
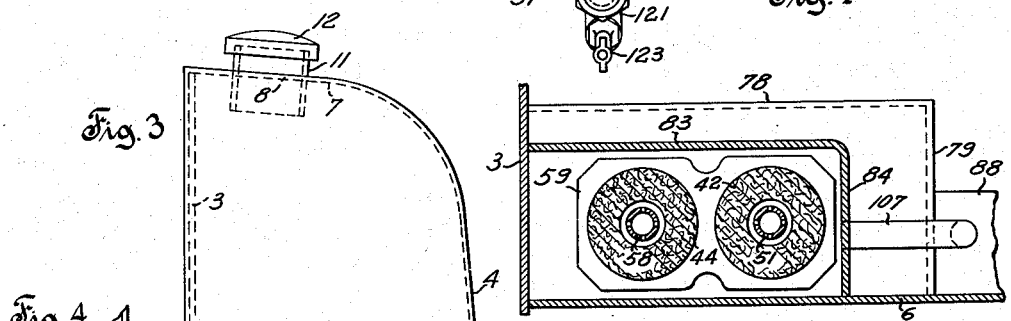
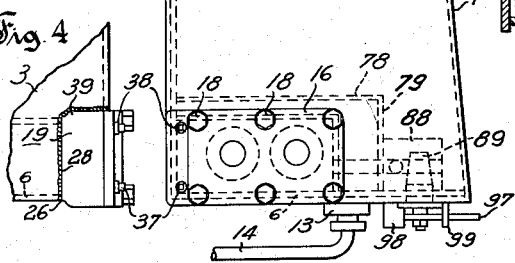
Inventors
William C. Geiser
Thomas J. Flamm
By
Attorney

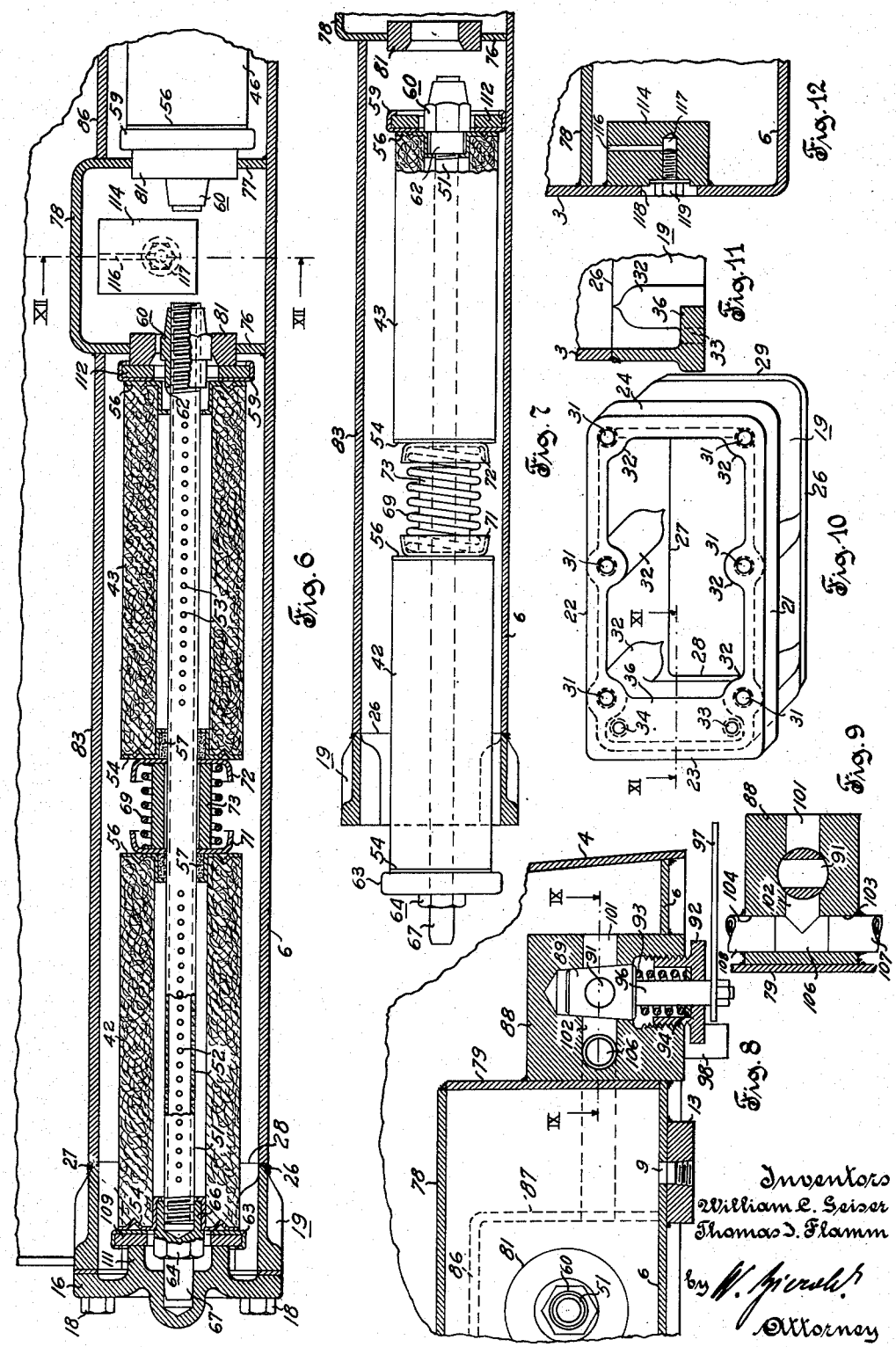

Patented Mar. 31, 1953

2,633,245

UNITED STATES PATENT OFFICE 2,633,245

FUEL TANK AND FILTER ASSEMBLY

William C. Geiser and Thomas J. Flamm, Springfield, Ill., assignors to Allis-Chalmers Manufacturing Company, Milwaukee, Wis., a corporation of Delaware Application January 14, 1948, Serial No. 2,238

9 Claims. (Cl. 210—170)

The invention relates to fuel supply systems for internal combustion engines, and it is concerned more particularly with a fuel storage and filtering system for use in motor vehicles which are powered by an internal combustion engine of the fuel injection type, and in which it is necessary to filter the fuel before it is admitted to the injecting mechanism of the engine.

In vehicles of the mentioned type, and more particularly in crawler tractors which are powered by a diesel engine, it has heretofore been usual to install the fuel tank and the necessary filtering mechanism as separate units on the vehicle, the preferred location of the fuel tank being at the rear of the vehicle and the preferred location of the filtering mechanism being in proximity to the forwardly mounted engine. If the fuel oil used in such vehicles is badly contaminated by impurities such as wax or gum, the capacity of the existing filters is sometimes too small for satisfactory operation of the vehicle, and in such instances attempts have been made during the past to install an extra bank of filters in order to increase the filtering capacity and thereby increase the time between filter changes. Such attempts, however, have been more or less unsatisfactory because of the required extra fuel lines, fittings, brackets and other parts, and also because of difficulties due to space limitations.

Generally, it is an object of the invention to provide an improved fuel supply system which will take care of the filtering requirements for badly contaminated fuel oils in a practical and entirely satisfactory manner, and which will avoid the difficulties which have heretofore been encountered in mounting an extra bank of filters in proximity to the engine.

More specifically, it is an object of the invention to provide an improved fuel tank and filter assembly which affords a storage space for a substantial quantity of unfiltered fuel, and in which the fuel withdrawn from said storage space is filtered before it leaves the tank, the necessary filtering mechanism being mounted entirely within the tank.

A further object of the invention is to insure a steady flow of fuel from the mentioned storage space through the filter mechanism to the engine, or in other words, to avoid the entry of air bubbles into the fuel line which connects the fuel tank with the engine.

A further object of the invention is to provide a fuel tank and filter assembly of the above mentioned character which is readily serviceable for the purpose of renewing the filter mechanism and of removing accumulated sludge and other impurities from the tank, when necessary.

A further object of the invention is to provide a fuel tank and filter assembly of the above mentioned character which may readily be substituted for the fuel tank of a motor vehicle of conventional construction.

A further object of the invention is to provide an improved unitary filter assembly, and more particularly one in which a plurality of relatively small capacity filter bodies are combined to form a unit of relatively large filtering capacity.

These and other objects and advantages are attained by the present invention, various novel features of which will be apparent from the description herein and the accompanying drawings disclosing an embodiment of the invention, and will be more particularly pointed out in the appended claims.

Referring to the drawings:

Fig. 1 is a rear view of a fuel tank and filter assembly, part of the rearwall of the fuel tank being broken away for purposes of exposure;

Fig. 2 is a sectional top view on line II—II of Fig. 1;

Fig. 3 is a side view of the fuel tank and filter assembly shown in Fig. 1;

Fig. 4 is a front view of the forward lower corner of the fuel tank shown in Fig. 3;

Fig. 5 is an enlarged partial section on line V—V of Fig. 1;

Fig. 6 is an enlarged partial section on line VI—VI of Fig. 2, showing a filter assembly and adjacent lower parts of the fuel tank;

Fig. 7 is a partial view similar to Fig. 6, showing the filter assembly in elevation and partly removed from the fuel tank;

Fig. 8 is an enlarged partial section on line VIII—VIII of Fig. 2;

Fig. 9 is a detail view in section on line IX—IX of Fig. 8;

Fig. 10 is an enlarged perspective view of a box forming part of the fuel tank shown in Figs. 1, 2 and 3;

Fig. 11 is a section on line XI—XI of Fig. 10; and

Fig. 12 is a partial section on line XII—XII of Fig. 6, showing a vent passage in a lower part of the fuel tank.

The fuel tank and filter assembly shown in the drawings is intended for use in a crawler type tractor, and more particularly for mounting behind the operator's seat where the fuel tank of such tractors is preferably located as mentioned hereinbefore, and as generally indicated, for instance, in one of the figures of U. S. Patent 2,326,486, granted on August 10, 1943 to E. F. Norelius for Track Release Mechanism. While the mounting structure for the present fuel tank and filter assembly is not shown in the drawings herein, it will be understood that such mounting structure conforms with the one which is ordinarily incorporated in the tractor for mounting a fuel tank of conventional construction, the fuel tank and filter assembly shown in the drawings being so constructed that it may be mounted on the tractor in lieu of the conventional fuel tank. It will further be understood that the tractor is powered by a forwardly located internal combustion engine of the fuel injection type, and that the fuel used in the tractor must be filtered before it is admitted to the injecting mechanism of the engine.

Referring to Figs. 1, 2 and 3 of the accompanying drawings, a receptacle conforming in size and general outside appearance with a rear mounted fuel tank of a conventional type crawler tractor comprises a pair of relatively spaced opposite side walls 1 and 2, a pair of transverse walls 3 and 4 connecting said side walls, and a generally flat horizontal bottom wall 6 connected along its side edges with the side walls 1 and 2, and along its front and rear edges with the transverse walls 3 and 4, respectively. The side walls 1 and 2 at the left and right sides, respectively, of the receptacle, and the transverse wall 3 which forms the front wall of the receptacle, extend upwardly from the bottom wall 6 at right angles thereto, and the transverse wall 4 which forms the rear wall of the receptacle extends upwardly from the bottom wall at a slight forward inclination. A top wall 7 of the receptacle extends rearwardly from the front wall 3 at a slight downward inclination and has arcuate side and rear portions merging with the side walls 1 and 2 and with the rear wall 4, respectively.

The receptacle formed by the walls 1 to 7 has a fuel feed opening 8 (Fig. 3) and a fuel draw opening 9 (Figs. 2 and 8) in communication, respectively, with an upper and a lower part thereof. A tubular filler stud 11 providing the feed opening 8 is welded to a hole in the top wall 7 of the receptacle, and is normally closed by a cap 12, the latter having a suitable vent passage, not shown, in conformity with conventional practice. The draw opening 9 is formed by a hole in a central portion of the bottom wall 6 between the side walls 1 and 2 (Fig. 2), and a flange 13 for connection with a fuel line 14 (Fig. 3) leading to the engine (not shown) is secured around the opening 9 at the bottom of the receptacle, the flange 13 being welded to the outer surface of the bottom wall 6.

In addition to the fuel feed opening 8 and the fuel draw opening 9, the receptacle formed by the walls 1 to 7 has a pair of auxiliary openings through which filter units may be inserted into and removed from the receptacle, as will be described more fully hereinbelow, one of said auxiliary openings being formed in the lower part of the left side wall 1 adjacent to the bottom wall 6 and normally closed by a cover 16 (Fig. 3), and the other auxiliary opening being formed in the lower part of the right side wall 2 adjacent to the bottom wall 6 and normally closed by a cover 17 (Figs. 1 and 2) which is a duplicate of the cover 16.

The cover 16 is secured by a series of cap screws 18 to a box 19 which is shown in detail in Fig. 10, and which is mounted in the lower forward corner at the left side of the receptacle. Another box 20 which is a duplicate of the box 19 and to which the cover 17 is secured, is mounted in the lower forward corner at the right side of the receptacle.

Referring to Fig. 10, a rectangular, relatively thick flange at the side of the box 19 to which the cover 16 is secured, has an outer horizontal bottom edge 21, an outer horizontal top edge 22, an outer vertical front edge 23 and an outer vertical rear edge 24. The bottom, top, front and rear walls of the box 19 merge with the flange in relatively close proximity to the mentioned bottom, top, front and rear edges, respectively, of the latter, and terminate, respectively, at the other side of the box, in a horizontal bottom edge 26, a horizontal top edge 27, a vertical front edge 28 and a vertical rear edge 29. The flange of the box has six tapped holes 31 for the reception of the cap screws 18, these holes extending into bosses 32 which are integrally formed with the flange and wall parts of the box at the inner side of the latter. Additional tapped holes 33 and 34 are formed in a web part 36 of the box which forms a vertical wall partially covering the side of the box to which the cover 16 is secured. As distinguished from the holes 31 which are blind, the holes 33 and 34 extend clear through the web part 36, the purpose of the hole 33 being to provide a drain opening, and the purpose of the hole 34 being to provide a vent opening, as will be explained more fully hereinbelow. As shown in Figs. 3 and 4, the hole 33 is closed by a pipe plug 37, and the hole 34 is closed by a pipe plug 38.

The side wall 1 of the receptacle, the front wall 3 and the bottom wall 6 are suitably cut out to provide for installation of the box 19 in the forward lower corner at the left side of the vehicle. As indicated in Figs. 1 and 3, the flange of the box 19 is welded along its horizontal upper edge 22 and along its vertical rear edge 24 to adjacent edge portions of the side wall 1, and as shown in Fig. 4, the front wall 3 of the receptacle has a cut-out which is welded along a vertical edge to the vertical edge 28 of the box 19, and along a horizontal edge 39 to the adjacent forward top corner of the box. The bottom wall 6 of the receptacle has a rectangular cut-out to accommodate the bottom wall of the box, one edge of said cut-out being welded to the horizontal edge 26 of the box, and the other edge of the cut-out being welded to the rear lower corner of the box, as indicated at 41 in Fig. 2.

The foregoing explanations with respect to the construction and mounting of the box 19 similarly apply to the construction and mounting of the box 20 which is located at the right side of the receptacle directly opposite to the box 19. The boxes, and more particularly the openings thereof which are normally closed by the covers 16 and 17, respectively, provide the hereinbefore mentioned auxiliary apertures through which filter units may be moved into and out of the receptacle formed by the walls 1 to 7.

In the embodiment of the invention as shown in the drawings, the receptacle formed by the walls 1 to 7 encloses two banks of filter units, one bank comprising four filter bodies 42 to 45, as indicated in Fig. 2, which are movable into and out of the receptacle through the auxiliary opening at the left side thereof, and the other bank comprising four filter bodies 46 to 49 which are movable into and out of the receptacle through the auxiliary opening of the receptacle at the right side thereof.

Referring to Fig. 6, the filter bodies 42 and 43 are of a commercially available type in which a suitable filtering material, such as cotton yarn, is wound into the shape of a hollow cylinder or tube of suitable thickness, and which will serve to filter fuel oil passing from the outer cylindrical surface of the tubular filter body to the hollow interior of the latter. The filter bodies 42 and 43 are mounted on a supporting tube 51 in surrounding and axially shiftable relation to radially perforated wall portions, respectively, of the latter, a series of radial holes 52 being formed in the part of the tube 51 which is surrounded by the filter body 42, and a corresponding series of radial holes 53 being formed in the part of the tube which is surrounded by the filter body 43. The filter body 42 is centered on the tube 51 in radially spaced relation thereto by means of two annular end plates 54 and 56, each of which has a centrally apertured cup portion extending axially into the filter body and an annularly ribbed flange portion bearing endwise against the filter body. An annular packing 57 in the cup portion of the end plate 56, seals said end plate in axially slidable relation to the tube 51.

The foregoing explanations with reference to the mounting of the filter body 42 on the tube 51 similarly apply to the mounting of the filter body 43 on the tube 51, corresponding parts being designated in Fig. 6 by the same reference characters.

Referring to Figs. 2 and 5, the filter bodies 44 and 45 forwardly of the filter bodies 42 and 43, are mounted on a tube 58 (Fig. 5) which is an exact duplicate of the tube 51, and the details of the mounting of the filter bodies 44 and 45 on the tube 58 are the same as the details of the mounting of the filter bodies 42 and 43 on the tube 51 and which have been explained hereinbefore with reference to Fig. 6.

The annular end plate 56 of the filter body 43 (Fig. 6) and the corresponding end plate of the filter body 45 (Fig. 2) are secured by welding to a common retainer plate 59 (Fig. 5) of generally rectangular shape and which has a pair of holes in axial alinement, respectively, with the tubes 51 and 58. As shown in Fig. 6, the tube 51 extends through the cup portion of the end plate 56 of the filter body 43 and beyond the latter through the corresponding hole of the retainer plate 59. The projecting end portion of the tube 51 is threaded and carries a relatively long nut 60 which has a hexagonal head and an annular collar 62 at the side of the head facing the end plate 56 of the filter body 43. The tube 58 carries a similar nut 61 as indicated in Fig. 2.

The annular end plate 54 of the filter body 42 (Fig. 6) and the corresponding annular end plate of the filter body 44 (Fig. 2) are secured by welding to another retainer plate 63 which is an exact duplicate of the retainer plate 59 shown in Fig. 5, the retainer plate 63, like the retainer 59 having a pair of holes in axial alinement, respectively, with the tubes 51 and 58. As shown in Fig. 6, the tube 51 has a threaded end portion within the cup of the end plate 54 of the filter body 42, and a cap nut 64 is screwed upon said threaded end portion of the tube 51. The cap nut 64 has a hexagonal head, an annular collar 66 within the cup of the adjacent end plate 54, and a cylindrical stud 67 in telescopic engagement with a blind hole in the cover 16. The supporting tube 58 for the filter bodies 44 and 45 carries a cap nut 68 (Fig. 2) corresponding to the cap nut 64 of the tube 51.

Operatively interposed between the filter bodies 42 and 43 are resilient pressure means in the form of a coil spring 69 which bears at its opposite ends upon cups 71 and 72 between the end plates 54 and 56 at the relatively opposed ends of the filter bodies 43 and 42, respectively. The cups 71 and 72 are axially slidable on the tube 51, and their relative approach, axially of the tube 51, is limited by a tubular spacer 73 which is mounted on the tube in axially slidable relation thereto between the cups 71 and 72. From Fig. 2 it will be noted that resilient pressure means corresponding to those between the filter bodies 42 and 43 are operatively interposed between the filter bodies 44 and 45, the coil spring between the latter filter bodies being indicated in Fig. 2 by the reference character 74, and which latter spring corresponds as to arrangement and function to the coil spring 69.

The entire assembly comprising the four filter bodies 42 to 45, the tubes 51, 58, the retainer plates 59, 63 and other associated parts including the springs 69 and 74, forms a unitary filter structure which may be preassembled outside of the receptacle, and which may be moved into and out of the receptacle through the auxiliary aperture thereof afforded by the box 19. Fig. 7 shows the assembled filter unit in a position which it may occupy relative to the receptacle when partly moved into the latter through the box 19.

The filter bodies 46, 47, 48 and 49 form part of another unitary filter structure which is an exact duplicate of the hereinbefore described filter structure comprising the filter bodies 42 to 45, and said other filter structure may be moved as an assembled unit into and out of the receptacle through the auxiliary aperture thereof afforded by the box 20.

Referring to Fig. 7, the position of the filter body 42 relative to the tube 51, as shown in this figure, is the same as shown in Fig. 6, and in which position the cup of the end plate 54 adjacent to the cap nut 64 axially abuts the collar 66 of the cap nut 64 (see Fig. 6). The other filter body 43 in Fig. 7 is axially displaced relative to the tube 51, as compared with Fig. 6, that is, the filter body 43 in Fig. 7 is displaced toward the nut 60 to a position in which the cup of the end plate 56 of the filter body 43 axially abuts the collar 62 of the nut 60. The mentioned displacement of the filter body 43 is effected by the coil spring 69 which, in the position of the parts as shown in Fig. 7, is in a state of axial compression and reacts between the filter bodies 42 and 43 to urge the latter axially in opposite directions relative to the tube 51. The cup of the end plate 54 of the filter body 42 and the collar 66 of the nut 64 constitute a pair of relatively engageable stop members which are associated, respectively, with the filter body 42 and with the tube 51, and the cup of the end plate 56 of the filter body 43 and the collar 62 of the nut 60 constitute another pair of relatively engageable stop members which are associated, respectively, with the filter body 43 and with the tube 51, to limit axial displacement of the filter bodies 42 and 43 in opposite directions relative to the tube 51 by the resilient pressure means 69. These explanations analogously apply to the unit comprising the filter bodies 44, 45, the tube 58 and the coil spring 74.

The unitary filter structure comprising the filter bodies 42 to 45 is operatively mounted within the receptacle formed by the walls 1 to 7, in unfiltered fuel receiving relation with the fuel feed opening 8 and in filtered fuel delivering relation with the fuel draw opening 9, and provisions for such mounting are made as follows:

Referring to Figs. 1 and 2, a draw-off chamber in communication with the fuel draw opening 9 is formed within the receptacle over the bottom wall 6 thereof and centrally between the side walls 1 and 2. The draw-off chamber comprises a pair of apertured vertical side wall members 76 and 77 opposite to and spaced, respectively, from the auxiliary apertures in the side walls 1 and 2; a solid horizontal top wall 78 connecting the side walls, and a solid vertical rear wall 79 connected with the side walls 76, 77 and with the top wall 78. The side walls 76 and 77 at opposite sides of the draw opening 9 are welded along their horizontal bottom edges to the bottom wall 6 of the receptacle, and along their vertical forward edges to the front wall 3; the top wall 78 is welded along its horizontal forward edge to the front wall 3 of the receptacle; and the rear wall 79 in the rear of the draw opening 9 is welded along its horizontal bottom edge to the bottom wall 6, the part of the bottom wall 6 which extends rearwardly from the front wall 3 between the side walls 76 and 77 and the rear wall 78 defining the bottom wall of the draw-off chamber, and the part of the front wall 3 which extends upwardly from the bottom wall 6, between the side walls 76 and 77 and the top wall 78 defining the front wall of the draw-off chamber.

Referring to Fig. 6, an annular collar 81 is secured, by welding, in a circular aperture of the side wall 76 of the draw-off chamber, and has an annular inner surface which affords a seat for telescopic engagement with the nut 60 on the tube 51. Another annular collar 82 (Fig. 2), corresponding to the collar 81, is secured in another hole of the side wall 76 of the draw-off chamber for telescopic engagement with the nut 61 on the tube 58. As indicated in Fig. 2, the side wall 77 of the draw-off chamber has a pair of collars corresponding to those of the side wall 76 for analogous purposes, the collars of the side wall 77, like those of the side wall 76, being designated by the reference characters 81 and 82.

At the opposite sides of the draw-off chamber, a pair of filter chambers are formed within the receptacle over the bottom wall 6 of the latter, and in communication, respectively, with the auxiliary apertures in the side walls 1 and 2 of the receptacle. The left filter chamber, that is the one at the side of the draw-off chamber opposite to the side wall 1 of the receptacle, comprises a connecting wall between the side wall 76 of the draw-off chamber and the side wall 1, a horizontal part of said connecting wall comprising the top wall of the box 19 and a horizontal top plate 83, and a vertical part of said connecting wall comprising the rear wall of the box 19 and a vertical rear plate 84. The top plate 83 is connected, by welding, along its opposite side edges to the horizontal edge 27 (Fig. 10) of the box 19 and to the side wall 76 of the draw-off chamber, and along its front edge (Fig. 5) to the front wall 3 of the receptacle. The rear plate 84 of the left filter chamber is formed integrally with the top wall 83 by bending a plate metal blank into angle shape, and the rear plate 84 is secured, by welding, along its opposite side edges to the vertical edge 29 (Fig. 10) of the box 19 and to the side wall 76 of the draw-off chamber, and along its bottom edge to the bottom wall 6 of the receptacle.

The right filter chamber, that is the one between the draw-off chamber and the side wall 2 of the receptacle, is associated with the box 20 and with the side wall 77 of the draw-off chamber in the same manner as explained hereinbefore in connection with the left filter chamber, the top plate of the right filter chamber being designated in Fig. 1 by the reference character 86, and the rear plate of the right filter chamber being designated in Fig. 2 by the reference character 87.

The left filter chamber communicates with the draw-off chamber through the apertures afforded by the collars 81 and 82 in the side wall 76, and the right filter chamber communicates with the draw-off chamber through the apertures afforded by the collars 81 and 82 in the side wall 77 of the draw-off chamber.

A valve housing 88 (Figs. 1 and 2) in the form of a rectangular metal block is mounted within the receptacle in rear of and adjacent to the rear wall 79 of the draw-off chamber. Referring to Fig. 8, a lower part of the valve housing 88 extends through an aperture of the bottom wall 6 of the receptacle, and a welded seam around said aperture, and welded seams at the edges of the valve housing adjacent to the rear wall 79 of the draw-off chamber, secure the valve housing in position within the receptacle.

Operatively mounted within the valve housing 88 is a conical valve body 89 which has a through-passage 91 at right angles to the axis of rotation of the valve body. A gland 92 is threaded into a countersunk opening of the valve housing from the bottom side of the latter, and a coil spring 93 which urges the valve body upwardly against its seat within the housing 88 bears at its upper end against a shoulder of the valve body and at its lower end upon a packing washer 94 which is heated on a flange portion of the gland 92. A cylindrical stem 96 of the valve body extends downwardly through the gland 92, and a handle 97 is nonrotatably secured to the lower end of the stem 96 below the gland 92. Rotation of the valve body 89 about its axis is limited to a range of 90 degrees by a stop 98 which is secured to the bottom wall 6 of the receptacle, and by another stop 99 (Figs. 1 and 3) which is likewise secured to the bottom wall 6 of the receptacle. In Figs. 8 and 9 the valve body 89 is shown rotatively adjusted to a position in which the handle 97 contacts the stop 99 (Fig. 3), and rotation of the handle 97 into contact with the stop 98 will turn the valve body about its axis through an angle of 90 degrees.

Referring to Figs. 8 and 9, the valve housing 88 has an inlet port 101 at its rear face in communication with a forwardly extending horizontal passage 102 which intersects the axis of the valve body 89 and is controlled by the latter, and two outlet ports 103 and 104 at the opposite ends, respectively, of a transverse passage 106 which in turn communicates with the forward end of the passage 102, as best shown in Fig. 9. A pipe elbow 107 (Fig. 2) connects the outlet port 103 of the valve housing 88 with an inlet port of the left filter chamber in proximity to the side wall 76 of the draw-off chamber, and another pipe elbow 108 connects the outlet port 104 of the valve housing 88 with an inlet port of the right filter chamber in proximity to the side wall 77 of the draw-off chamber.

In the operative condition of the fuel tank and filter assembly, the auxiliary apertures afforded by the boxes 19 and 20 are closed by the covers 16 and 17, respectively, and the filter units are operatively disposed in the left and right filter chambers, as indicated in Fig. 6. A seal washer 109 on the retainer plate 63 cooperates with the latter and with an annular shoulder 111 on the cover 16 to prevent the passage of unfiltered fuel past the end of the filter body 42 adjacent to the cover 16, and another seal washer 112 on the retainer plate 59 cooperates with the latter and with the collar 81 to prevent the passage of unfiltered fuel past the end of the filter body 43 adjacent to the side wall 76 of the draw-off chamber. Passage of unfiltered fuel past the relatively adjacent ends of the filter bodies 42 and 43 is prevented by the packings 57 in the cups of the end plates 56 and 54 which, as explained hereinbefore, are associated with the filter bodies 42 and 43, respectively, at their relatively adjacent ends.

The lengths of the filter bodies 42 and 43, and the length of the spacer 73 are so proportioned that when the cap screws 18 for the cover 16 are drawn up, axial pressure is applied by the shoulder 111 of the cover 16 upon the seal washer 109, and that such axial pressure is transmitted through the filter body 42, spacer 73, filter body 43 and seal washer 112 to the collar 81 of the side wall 76 of the draw-off chamber. In other words, the tightening of the cap screws 18 forces the shoulder 111 of the cover 16 into proper axial sealing contact with the seal washer 109 and simultaneously forces the seal washer 112 into proper axial sealing contact with the collar 81. The coil spring 69 becomes effective to maintain the seal washers 109 and 112 in proper axial sealing contact with the shoulder 111 and with the collar 81, when the filter bodies 42 and 43 assume a permanent set under the axial pressure to which they become subjected when the cap screws 18 are drawn up.

The foregoing explanations with respect to the end seals which prevent passage of unfiltered fuel past the filter bodies 42 and 43, analogously apply to the filter bodies 44 and 45, another portion of the packing washer 112 on the retainer plate 59 cooperating with the collar 82 (Fig. 2), and another portion of the packing washer 109 on the retainer plate 63 cooperating with an annular shoulder 113 (Fig. 2) on the cover 16, corresponding to the annular shoulder 111.

The mounting of the filter bodies 46 to 49 in the right filter chamber corresponds to that of the filter bodies 42 to 45 in the left filter chamber which has been explained hereinbefore.

The fuel feed opening 8 communicates with a relatively large space within the receptacle, which serves as a storage space for unfiltered fuel, and which is bounded in part by the receptacle walls and in part by the wall parts of the draw-off and filter chambers. From the mentioned storage space, the fuel may flow into the passage 102 of the valve housing 88, and upon adjustment of the valve body 89 to a position in which its through passage 91 registers with the passage 102, the unfiltered fuel may flow through the pipe elbow 107 into the left filter chamber and through the pipe elbow 108 into the right filter chamber. After passing through the filter bodies in the respective filter chambers, the fuel flows into the draw-off chamber and from the latter through the draw opening 9 into fuel line 14 leading to the engine.

The filter assemblies in the right and left filter chambers are individually connected in filtered fuel delivering relation with the draw-off chamber, and if one of the filter assemblies should become inoperative, the other which might still be operative or might have been renewed, will permit passage of an adequate amount of filtered fuel into the draw-off chamber.

In operation of the vehicle upon which the described fuel tank and filter assembly is installed, the fuel in the storage chamber of the receptacle may become subject to considerable surging due to jolting of the vehicle, but in spite of these conditions there will be relatively little surging of the fuel in the draw-off chamber. Back flow of fuel from the draw-off chamber into the storage chamber is impeded by the filter units in the right and left filter chambers.

Under certain conditions, for instance when the fuel supply in the receptacle has been exhausted and is replenished, air may become trapped in the filter chambers and/or in the draw-off chamber. Such air may interfere with a steady flow of fuel into the fuel feed line 14, and if air bubbles should enter the feed line the performance of the engine would become very rough. The hole 34 (Fig. 10) in the web 36 of the box 19 provides a vent opening for the left filter chamber through which any air trapped in said filter chamber may be expelled after the plug 38 has been loosened in said hole. The hole 33 in the lower part of the web 36 provides a drain opening for the left filter chamber and is normally closed by the plug 37.

The foregoing explanations with respect to the vent and drain openings of the left filter chamber, analogously apply to the right filter chamber, the box 20 having vent and drain openings corresponding to those of the box 19.

A vent passage for the draw-off chamber is provided at the forward part of the latter, as best shown in Fig. 12. A block 114 within the draw-off chamber is welded to the front wall 3 of the receptacle and has a vertical bore 116 extending downwardly from the top surface of the block 114, and a horizontal bore 117 which communicates with the lower end of the bore 116 and registers with a hole 118 in the front wall 3 of the receptacle. The bore 117 is threaded, and a cap screw 119 is screwed into the bore 117 to normally close the vent passage afforded by the bores 116 and 117. It will be noted that this vent passage leads from an upper part of the draw-off chamber through the front wall 3 of the receptacle.

A main drain for the fuel storage chamber is provided in the bottom wall 6 of the receptacle rearwardly of the right filter chamber, and is generally indicated in Figs. 1 and 2 by the reference character 121. It includes an elbow which is normally closed by a cap 122, and a small drain cock 123 mounted on the elbow.

Upon removal of the cover 16 from the box 19 the entire filter unit comprising the filter bodies 42 to 45, the tubes 51, 58 and associated parts including the retainer plates 59 and 63, may be withdrawn laterally from the receptacle, as indicated in Fig. 7. The initial outward movement of the filter unit causes the nut 60 on the tube 51 to slide out of the collar 81, and the nut 61 on the tube 58 to slide out of the collar 82. As a result, the bottom edge of the retainer plate 59 will come to rest on the bottom of the filter chamber, and as the filter unit is withdrawn from the receptacle the retainer plate 59 will act as a scraper to remove accumulated sludge from the filter chamber. While such scraping action of the retainer plate 59 is somewhat imperfect because the retainer plate is not as wide as the spacing between the front and rear walls of the box 19 and because it must be suitably shaped, as shown in Fig. 5, to clear the bosses 32 of the box, the retainer plate 59 is nevertheless effective to remove a substantial amount of the sludge which may have accumulated in the filter chamber. The apertures afforded by the boxes 19 and 20 are large enough to permit convenient thorough cleaning of the filter chambers after the filter units have been removed therefrom.

Fuel flow from the fuel storage chamber to the filter chambers may be selectively established and interrupted by the valve comprising the valve housing 88 and valve body 89, the valve body being shown in Figs. 8 and 9 adjusted to a position in which such fuel flow is interrupted, and from which position the valve body may be adjusted to a fuel flow establishing position by moving the handle 97 into contact with the stop 98. It will be noted that the valve body 89 is movable into and out of the valve housing from below and through the apertured portion of the bottom wall 6 to which the valve housing 88 is secured, as explained hereinbefore.

Considering the herein disclosed embodiment of the invention from a general point of view, it will be noted that a vehicle type fuel storage receptacle is provided with a partition structure which is disposed within said receptacle and coacts with wall portions thereof to form a pair of internal chambers adjacent to the bottom of said receptacle. One of said chambers, which forms a draw-off chamber, is spacedly disposed opposite a vertically extending wall portion of the receptacle, such as the side wall 1 at the left in Figs. 1 and 2, and the other of said chambers, which may be considered as being represented by the filter chamber at the left in Figs. 1 and 2, presents terminal end portions enclosing aligned apertures provided in said vertically extending wall portion 1 and in an opposing wall portion 76 of said draw-off chamber. A hollow filter unit, as represented by the filter assembly 42, 43, 44, 45, is disposed in the filter chamber at the left in Figs. 1 and 2, with the inner end of the filter unit operatively covering the aperture in the side wall 76 of the draw-off chamber and placing the latter in constant communication with the interior of the filter unit. A cover element, as represented by the left cover 16 in Figs. 1 and 2, closes the aperture in the side wall 1 and operatively coacts with the adjacent end of the filter unit for releasably mounting the latter with its inner end positioned as aforesaid. A first passage defining means, as represented by the elbow 107 and associated valve 88, 89, places the portion of the receptacle exterior of the draw-off and filter chambers in communication with the left filter chamber; and a second passage defining means, as represented by the flange 13 and fuel line 14, is operative for conducting liquid from the draw-off chamber to a point exterior of the receptacle.

It should be understood that it is not intended to limit the invention to the particular forms and details described hereinabove, and that the invention includes such other forms and modifications as are embraced by the scope of the appended claims.

It is claimed and desired to secure by Letters Patent:

1. A fuel tank and filter assembly comprising, in combination, a receptacle having a pair of relatively spaced side walls, a pair of transverse walls connecting said side walls, a bottom wall connected with said side and transverse walls and having a fuel draw opening at a central portion thereof between said side walls, each of said side walls having an auxiliary aperture adjacent to said bottom wall; a central draw-off chamber formed within said receptacle over said central portion of said bottom wall and including a pair of apertured wall members opposite to and spaced, respectively, from said auxiliary apertures, a connecting wall between one of said apertured wall members and the opposite side wall of said receptacle, and another connecting wall between the other of said apertured wall members and the opposite side wall of said receptacle, said connecting walls being mounted over said bottom wall to define a pair of filter chambers within said receptacle at opposite sides, respectively, of said draw-off chamber, filtering units movable into and out of said filter chambers, respectively, through said auxiliary apertures and connected, respectively, with said apertured wall members of said draw-off chamber in filtered fuel delivering relation with the latter, valve means mounted within said receptacle and operable to establish and interrupt fuel flow from an upper part of said receptacle into said filter chambers, and covering means for said auxiliary apertures detachably secured, respectively, to said side walls of said receptacle.

2. A fuel tank and filter assembly as set forth in claim 1, and further comprising means for venting said filter chambers, each of said filter chambers having a vent passage leading from an upper part thereof to the outside of said receptacle.

3. A fuel tank and filter assembly as set forth in claim 1, and further comprising means for venting said draw-off chamber, the latter having a vent passage leading from an upper part thereof to the outside of said receptacle.

4. A fuel tank and filter assembly as set forth in claim 1, and further comprising means for venting said draw-off chamber and filter chambers, said draw-off chamber having a vent passage leading from an upper part thereof through one of said transverse walls of said receptacle, and said filter chambers having vent passages leading, respectively, from upper parts of said filter chambers through said side walls of the receptacle adjacent thereto.

5. A fuel tank and filter assembly as set forth in claim 1, and further comprising scraper plates connected, respectively, with said filter units and operable to scrape the bottoms of said filter chambers upon withdrawal of said filter units through said auxiliary apertures of said receptacle.

6. A combination fuel tank and filter assembly comprising: a vehicle type fuel storage receptacle; a partition structure disposed within said receptacle and coacting with wall portions thereof to form a pair of internal chambers disposed adjacent the bottom of said receptacle, said chambers including a draw-off chamber spacedly disposed opposite a vertically extending wall portion of said receptacle, and a filter chamber presenting terminal end portions enclosing aligned apertures provided in said vertically extending wall portion and in an opposing wall portion of said draw-off chamber; a hollow filter unit disposed in said filter chamber with its inner end operatively covering the aperture in said wall portion of said draw-off chamber and placing the latter in constant communication with the interior of said unit; a cover element sealingly closing the aperture in said vertically extending wall portion of said receptacle and operatively coacting with the adjacent end of said filter unit for releasably mounting the latter with its inner end positioned as aforesaid; a first passage defining means placing the portion of said receptacle exterior of said chambers in communication with the interior of said filter chamber; and a second passage defining means operative for conducting liquid from said draw-off chamber to a point exterior of said receptacle.

7. A combination fuel tank and filter assembly comprising: a vehicle type fuel storage receptacle; a partition structure disposed within said receptacle and coacting with wall portions thereof to form internal chambers disposed adjacent the bottom of said receptacle, said chambers including a draw-off chamber spacedly disposed between a pair of vertically extending opposite wall portions of said receptacle, and a pair of filter chambers disposed on opposite sides of said draw-off chamber and each presenting terminal end portions enclosing a pair of aligned apertures provided in one of said vertically extending wall portions and in an opposing wall portion of said draw-off chamber; a hollow filter unit disposed in each of said filter chambers with its inner end operatively covering the aperture in said wall portion of said draw-off chamber and placing the latter in constant communication with the interior of said unit; a cover element sealingly closing the aperture in each of said vertically extending wall portions of said receptacle and operatively coacting with the adjacent end of said filter unit for releasably mounting the latter with its inner end positioned as aforesaid; a first passage defining means placing the portion of said receptacle exterior of said chambers in communication with the interior of said filter chamber; and a second passage defining means operative for conducting liquid from said draw-off chamber to a point exterior of said receptacle.

8. A combination fuel tank and filter assembly comprising: a vehicle type fuel storage receptacle; a partition structure disposed within said receptacle and coacting with wall portions thereof to form a pair of internal chambers disposed adjacent the bottom of said receptacle, said chambers including a draw-off chamber spacedly disposed opposite a vertically extending wall portion of said receptacle, and a filter chamber presenting terminal end portions enclosing aligned apertures provided in said vertically extending wall portion and in an opposing wall portion of said draw-off chamber; a hollow filter unit disposed in said filter chamber with its inner end operatively covering the aperture in said wall portion of said draw-off chamber and placing the latter in constant communication with the interior of said unit; a cover element sealingly closing the aperture in said vertically extending wall portion of said receptacle and operatively coacting with the adjacent end of said filter unit for releasably mounting the latter with its inner end positioned as aforesaid; a first passage defining means comprising an interior valve housing disposed adjacent the bottom wall of said receptacle and placing the portion thereof exterior of said chambers in communication with the interior of said filter chamber, said valve housing operatively mounting a valve body presenting an actuating part disposed exterior to said receptacle and being selectively movable for controlling said communication between said receptacle and said filter chamber; and a second passage defining means operative for conducting liquid from said draw-off chamber to a point exterior of said receptacle.

9. A fuel tank and filter assembly as set forth in claim 8, and in which said valve housing is mounted in covering relation to an aperture provided in said bottom wall, and in which said valve body is movable into and out of said valve housing through said aperture in the bottom wall of said receptacle.

WILLIAM C. GEISER.
THOMAS J. FLAMM.

REFERENCES CITED

The following references are of record in the file of this patent:

UNITED STATES PATENTS

| Number | Name | Date |
|---|---|---|
| 966,179 | Durbrow | Aug. 2, 1910 |
| 1,140,459 | Holt | May 25, 1915 |
| 1,150,086 | Willemstyn | Aug. 17, 1915 |
| 1,153,282 | Zahm | Sept. 14, 1915 |
| 1,223,299 | Taylor | Apr. 17, 1917 |
| 1,331,237 | Burris | Feb. 17, 1920 |
| 1,408,785 | Torley | Mar. 7, 1922 |
| 1,581,998 | Fulcher | Apr. 20, 1926 |
| 1,746,274 | Otis, Jr. | Feb. 11, 1930 |
| 1,759,447 | Fisher | May 20, 1930 |
| 1,922,315 | Mooz | Aug. 15, 1933 |
| 2,001,610 | Hildenbrand | May 14, 1935 |
| 2,011,031 | Birch | Aug. 13, 1935 |
| 2,306,297 | Curtis | Dec. 22, 1942 |
| 2,339,703 | Kamrath | Jan. 18, 1944 |
| 2,344,486 | Arvins | Mar. 21, 1944 |

FOREIGN PATENTS

| Number | Country | Date |
|---|---|---|
| 97,314 | Switzerland | Jan. 2, 1923 |
| 642,113 | Germany | Apr. 21, 1937 |